Patented Feb. 9, 1943

2,310,659

UNITED STATES PATENT OFFICE 2,310,659

RECOVERY OF LOW-BOILING ORGANIC COMPOUNDS FROM COKE OVEN BY-PRODUCTS

Frederick M. Thatcher, Clairton, and Joseph H. Wells and Philip J. Wilson, Jr., Pittsburgh, Pa.; said Wells and said Wilson assignors to Carnegie-Illinois Steel Corporation, a corporation of New Jersey No Drawing. Application January 22, 1942, Serial No. 427,842

3 Claims. (Cl. 260—666)

The light oil which is recovered from coke oven gas contains cyclopentadiene. Due to its low boiling point, 40° C., much of this compound is vaporized during the distillation of the light oil and lost. The cyclopentadiene may be recovered by refrigeration of the low-boiling vapors which leave a light oil still, but refrigerating machinery is expensive to install and operate. It may also be recovered by scrubbing the same vapors with a solvent for the cyclopentadiene, followed by distillation of the solution to remove the solute from its solvent. Cyclopentadiene, however, gradually polymerizes to dicyclopentadiene, which boils at 172° C., and this polymerization is accelerated by increase in temperature. If a high-boiling solvent, such as a petroleum oil, is used, high still temperatures are necessary for distillation of the dicyclopentadiene, or cyclopentadiene, to which the former will tend to revert at temperatures near its boiling point. The high temperatures promote undesirable reactions between the cyclopentadiene, solvent, and other organic compounds which are removed from the gas. On the other hand, if a low-boiling solvent, such as benzol, is used for scrubbing the low-boiling vapors from the light oil still, the losses of the solvent will be excessive in the undissolved vapors.

We have found, however, that by use of dicyclopentadiene, as the solvent at a temperature above its melting point, the vapors from the light oil stills may be scrubbed to recover the cyclopentadiene without any excessive loss of the solvent.

The solution is then treated by heat, or other means, to polymerize the dissolved cyclopentadiene into dicyclopentadiene which can be returned to the scrubbing system for recovery of additional amounts of cyclopentadiene. The excess dicyclopentadiene is removed from time to time, as it accumulates, in order to maintain the volume of circulating solvent constant.

Other low-boiling compounds in the vapors from the light oil stills, such as carbon disulfide, pentenes, and the like, will be dissolved by the dicyclopentadiene. After polymerizing the dissolved cyclopentadiene, however, these can readily be separated by distillation and recovered.

The process may be applied to other vapors than those from light oil or benzol stills. It may be, for instance, utilized for recovery of cyclopentadiene from coke oven gas itself.

We claim:

1. A method of recovering low-boiling organic compounds from coke oven by-product vapors or gas, characterized by scrubbing said vapors with liquid dicyclopentadiene to dissolve said compounds therein and recover said compounds therefrom.

2. A method of recovering cyclopentadiene from coke oven by-product vapors containing the same, comprising scrubbing said vapors with liquid dicyclopentadiene to dissolve said cyclopentadiene therein.

3. A method of recovering cyclopentadiene from coke oven by-product vapors containing the same, comprising scrubbing said vapors with liquid dicyclopentadiene to dissolve said cyclopentadiene therein, converting said dissolved cyclopentadiene to dicyclopentadiene and reusing the latter in liquid phase for scrubbing more of said vapors.

FREDERICK M. THATCHER.
JOSEPH H. WELLS.
PHILIP J. WILSON, JR.